US00RE47032E

(19) United States
(12) Reissued Patent
Kim

(10) Patent Number: US RE47,032 E
(45) Date of Reissued Patent: Sep. 11, 2018

(54) TERMINAL FOR WIRELESS COMMUNICATION

(71) Applicant: Samsung Electronics Co., Ltd., Suwon-Si (KR)

(72) Inventor: Dong-Kyun Kim, Seoul (KR)

(73) Assignee: Samsung Electronics Co., Ltd., Suwon-si (KR)

(21) Appl. No.: 29/546,451

(22) Filed: Nov. 23, 2015

Related U.S. Patent Documents

Reissue of:
(64) Patent No.: Des. 685,774
Issued: Jul. 9, 2013
Appl. No.: 29/425,665
Filed: Jun. 26, 2012

U.S. Applications:
(62) Division of application No. 29/508,182, filed on Nov. 4, 2014, which is an application for the reissue of Pat. No. Des. 685,774.

(30) Foreign Application Priority Data

Jan. 13, 2012 (KR) ..... 30-2012-0001869

(51) LOC (11) Cl. ..... 14-03
(52) U.S. Cl.
USPC ..... D14/240; D14/358
(58) Field of Classification Search
USPC ..... D14/371–376, 125–130, 336, 337, 341, D14/217, 142, 239, 240, 434, 238.1; (Continued)

(56) References Cited

U.S. PATENT DOCUMENTS

D383,131 S * 9/1997 Biasotti et al. ..... D14/149
D432,105 S * 10/2000 Hyun ..... D14/138 AB
(Continued)

*Primary Examiner* — Darlington Ly
(74) *Attorney, Agent, or Firm* — NSIP Law

(57) CLAIM

[The] *I claim the* ornamental design for a terminal for wireless communication, as shown and described.

DESCRIPTION

FIG. 1 is a front perspective view of a terminal for wireless communication *showing my new design*;
FIG. 2 is a front *elevation* view [of the terminal for wireless communication of FIG. 1] *thereof*;
FIG. 3 is a rear *elevation* view [of the terminal for wireless communication of FIG. 1] *thereof*;
FIG. 4 is a left-side *elevation* view [of the terminal for wireless communication of FIG. 1] *thereof*;
FIG. 5 is a right-side *elevation* view [of the terminal for wireless communication of FIG. 1] *thereof*;
FIG. 6 is a top plan view [of the terminal for wireless communication of FIG. 1] *thereof*;
FIG. 7 is a bottom plan view [of the terminal for wireless communication of FIG. 1] *thereof*;
FIG. 8 is a rear perspective view [of the terminal for wireless communication of FIG. 1] *thereof*; [and,]
FIG. 9 is a rear *elevation* view [of] *thereof, in which* the terminal for wireless communication [of FIG. 1 illustrating an example of how the terminal for wireless communication of FIG. 1 may be] *is shown* docked to a tablet PC[.]; *and, FIG. 10 is a rear elevation view thereof, in which the terminal for wireless communication is shown detached from a tablet PC.*
[Features shown in broken lines in FIG. 9] *In FIGS. 9 and 10, the broken line showing the tablet PC is provided for the purpose of illustrating environmental structure and forms no part of the claimed design. All other broken lines in the drawings illustrate portions of the terminal for wireless communication that* form no part of the claimed design.

1 Claim, 15 Drawing Sheets

Matter enclosed in heavy brackets [ ] appears in the original patent but forms no part of this reissue; matter printed in italics indicates the additions made by reissue.

AMENDED

(58) Field of Classification Search
USPC ..... D6/308, 311; 361/679.08, 679.23; 349/1, 2, 11, 58; 345/104, 156, 173, 174; 341/12; 248/917–924, 371
CPC ..... F16M 11/08; F16M 11/22; F16M 2200/08
See application file for complete search history.

(56) References Cited

U.S. PATENT DOCUMENTS

| | | | | | |
|---|---|---|---|---|---|
| D439,571 | S | * | 3/2001 | Hyun | D14/138 AB |
| D480,058 | S | * | 9/2003 | Chin | D14/138 AB |
| D514,590 | S | * | 2/2006 | Naruki | D14/203.3 |
| D551,644 | S | * | 9/2007 | Kim et al. | D14/138 AB |
| D558,763 | S | * | 1/2008 | Morganstern et al. | D14/480.7 |
| D565,018 | S | * | 3/2008 | Arbisi | D14/138 AB |
| D579,906 | S | * | 11/2008 | Kim et al. | D14/138 AD |
| D582,367 | S | * | 12/2008 | Kim et al. | D14/138 AB |
| D619,981 | S | * | 7/2010 | Chuang | D14/138 R |
| D629,373 | S | * | 12/2010 | Kim | D14/126 |
| D648,697 | S | * | 11/2011 | Castano | D14/138 AB |
| D669,070 | S | * | 10/2012 | Hsu | D14/341 |
| D671,939 | S | * | 12/2012 | Chung | D14/130 |
| D675,196 | S | * | 1/2013 | Maddern | D14/240 |
| D677,181 | S | * | 3/2013 | Lenz | D10/65 |
| 8,605,433 | B2 | * | 12/2013 | Chiang | F16M 11/10 361/679.59 |
| 8,605,443 | B2 | | 12/2013 | Yang | |
| 8,606,340 | B2 | * | 12/2013 | Pegg | H04M 1/0247 455/575.4 |
| D701,570 | S | * | 3/2014 | Fletcher | D19/113 |
| D701,862 | S | * | 4/2014 | Lee | D14/420 |
| D702,231 | S | * | 4/2014 | Park | D14/341 |
| D704,200 | S | * | 5/2014 | Rayner | D14/447 |
| D722,049 | S | * | 2/2015 | Moradian | D14/341 |
| 2006/0236014 | A1 | | 10/2006 | Yin et al. | |
| 2010/0309617 | A1 | | 12/2010 | Wang et al. | |

* cited by examiner

Figure 1:
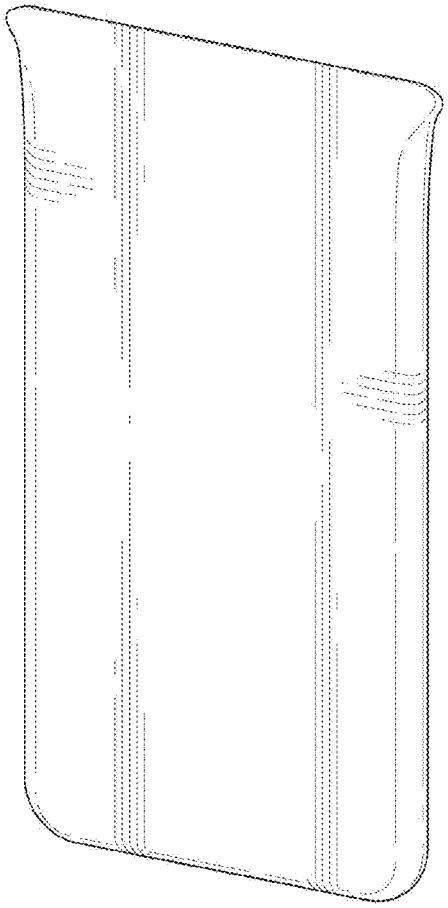

AMENDED
FIG. 1
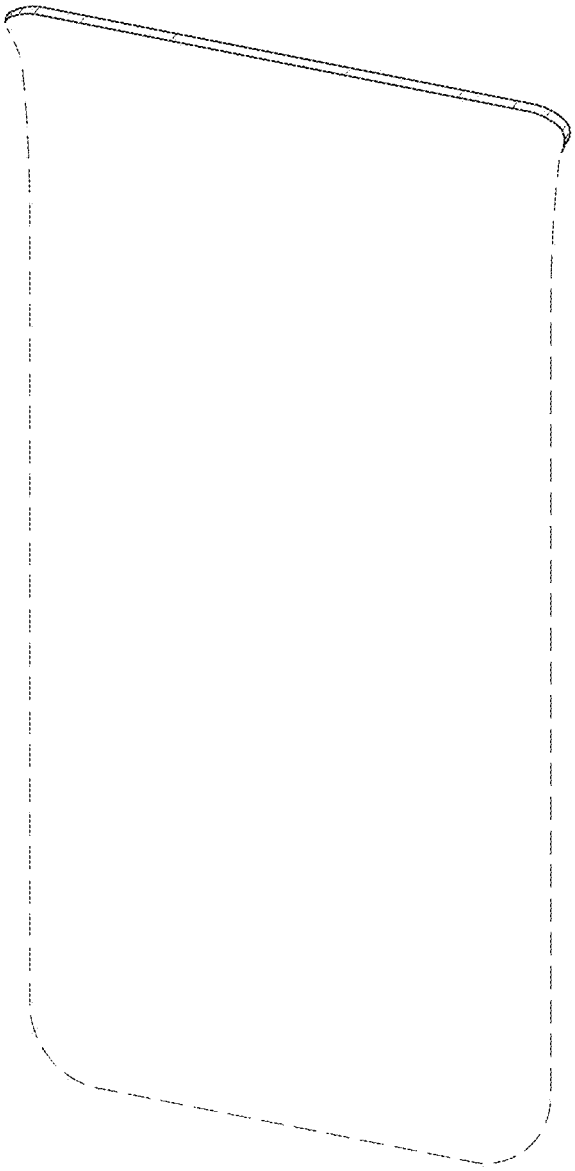

Figure 2:
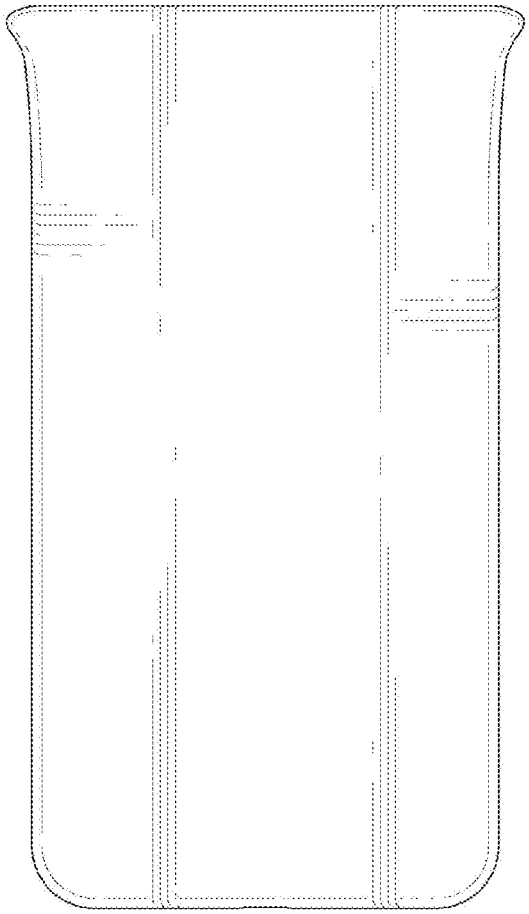

AMENDED
FIG. 2
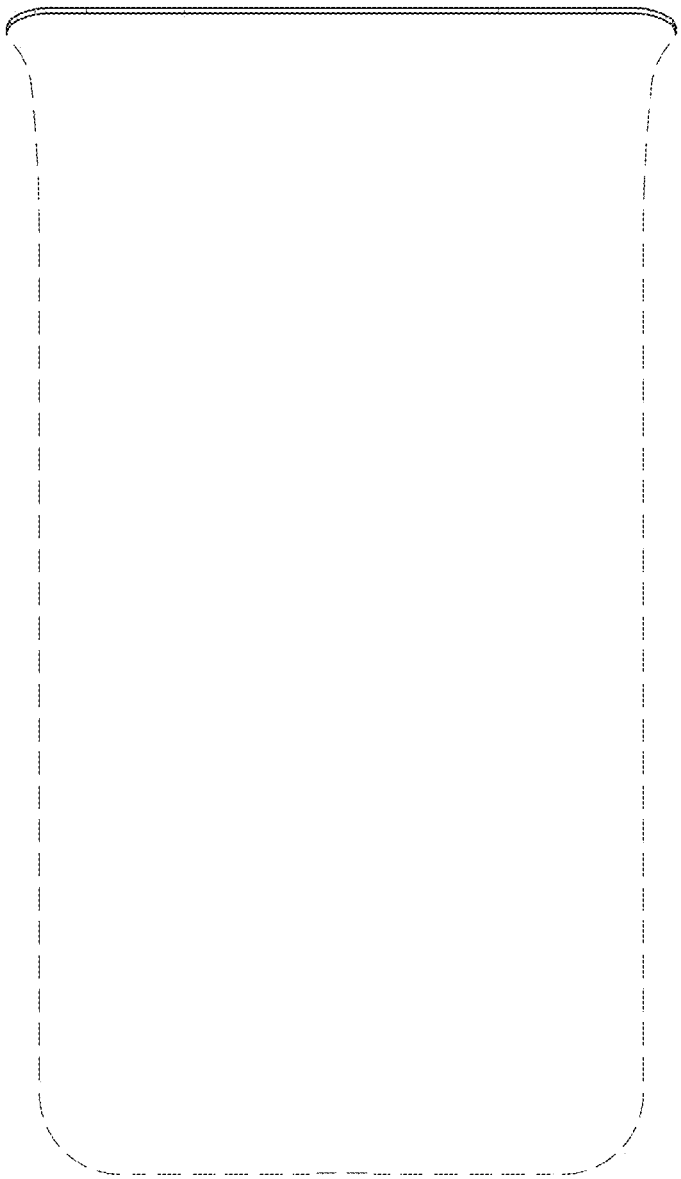

Figure 3:
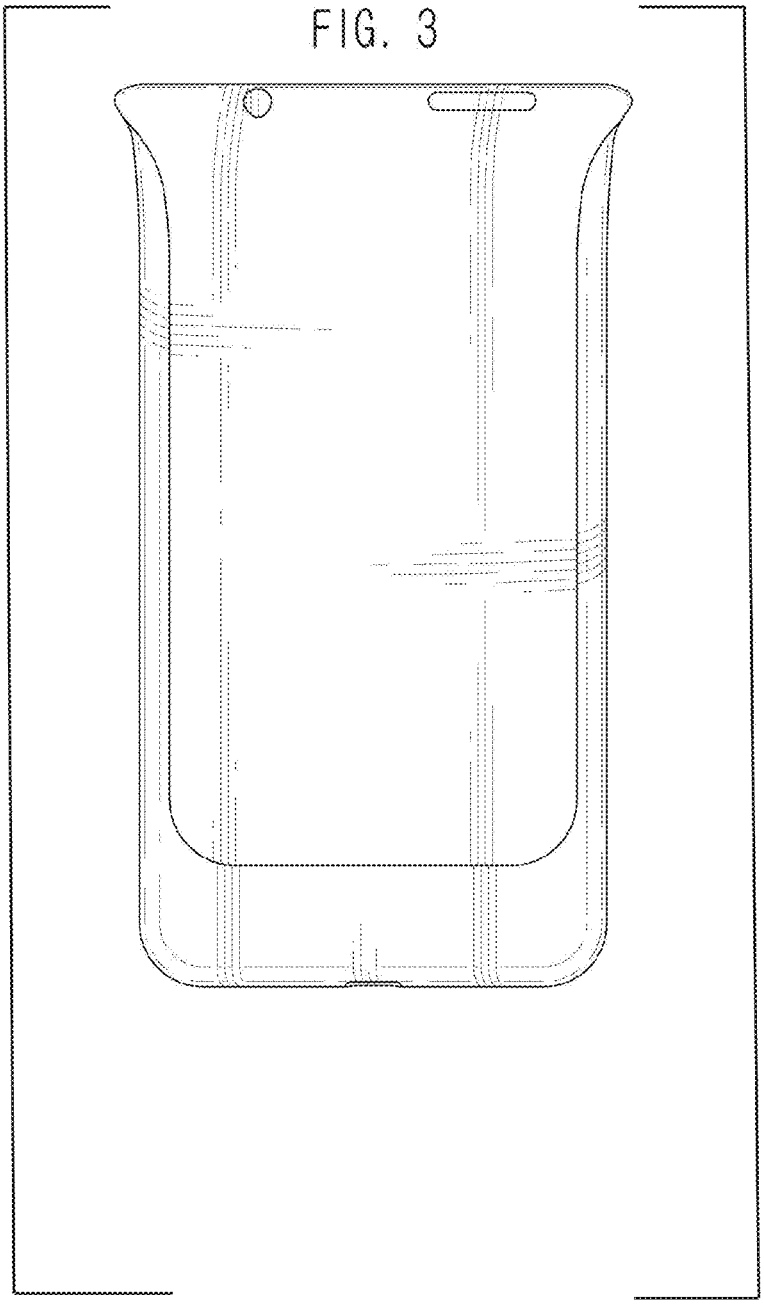

AMENDED
FIG. 3
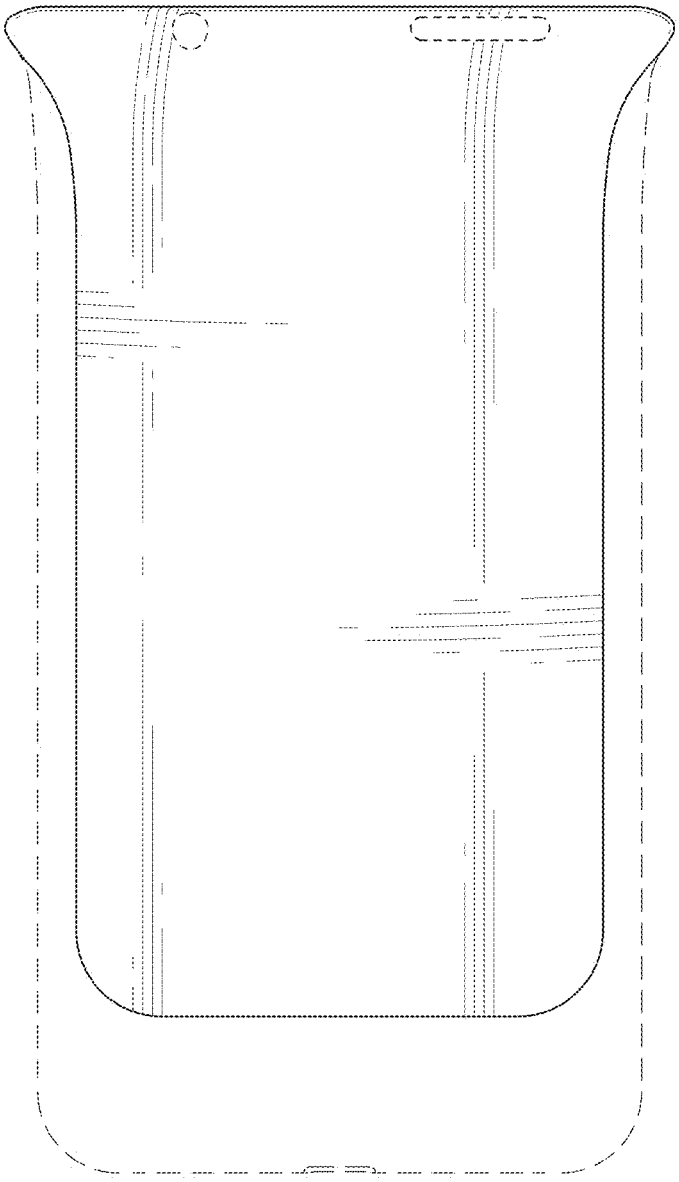

Figure 4:
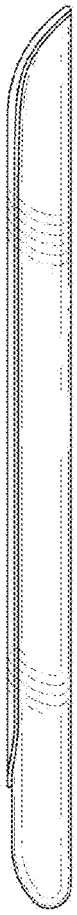
Figure 5:
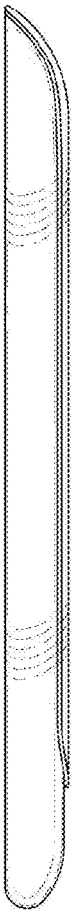

AMENDED
FIG. 4
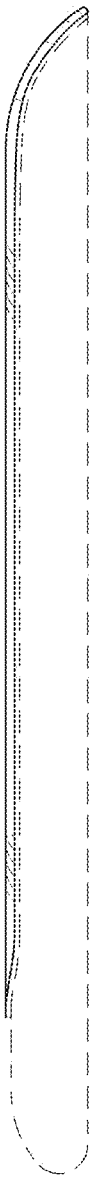
AMENDED
FIG. 5
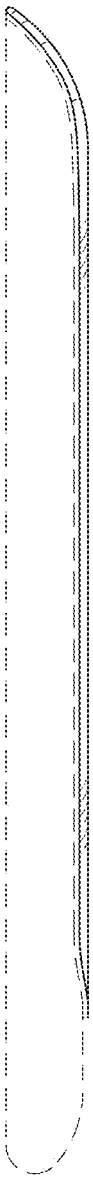

Figure 6:
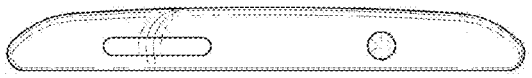
Figure 7:
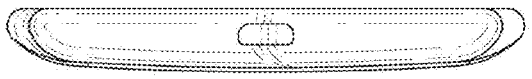

AMENDED
FIG. 6
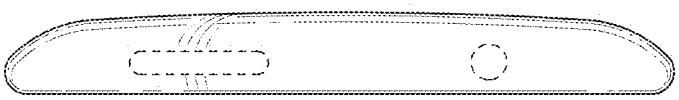
AMENDED
FIG. 7
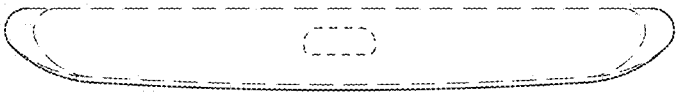

Figure 8:
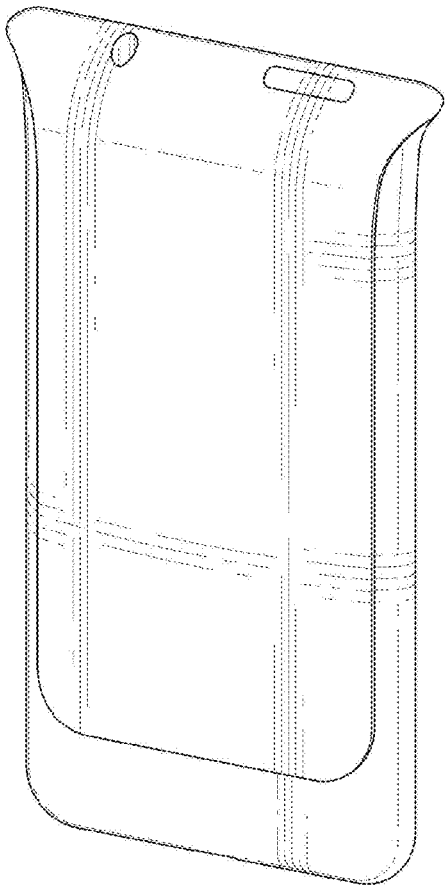

AMENDED
FIG. 8
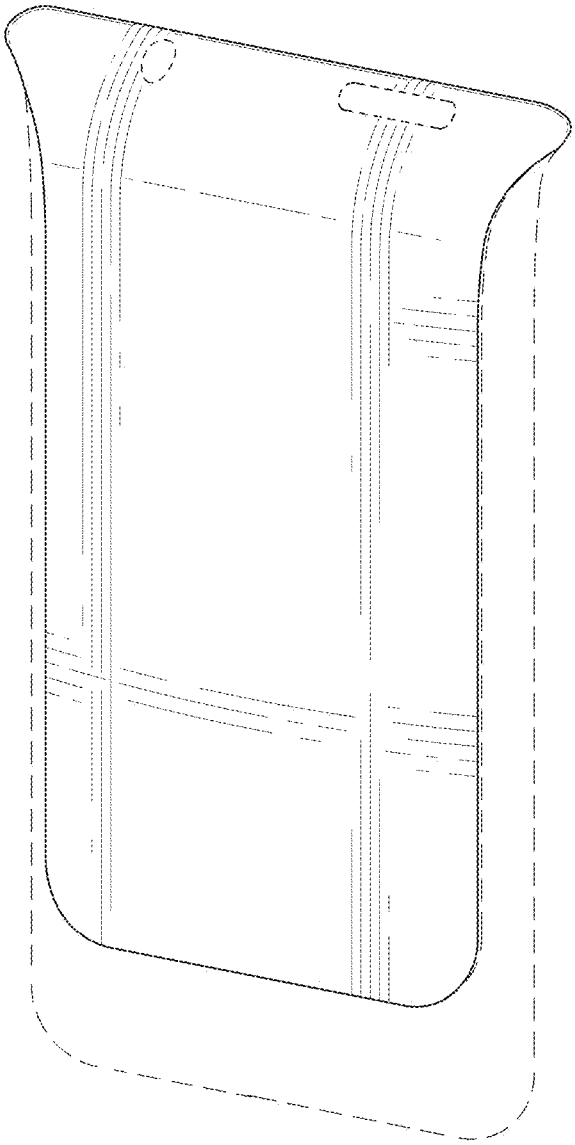

Figure 9:
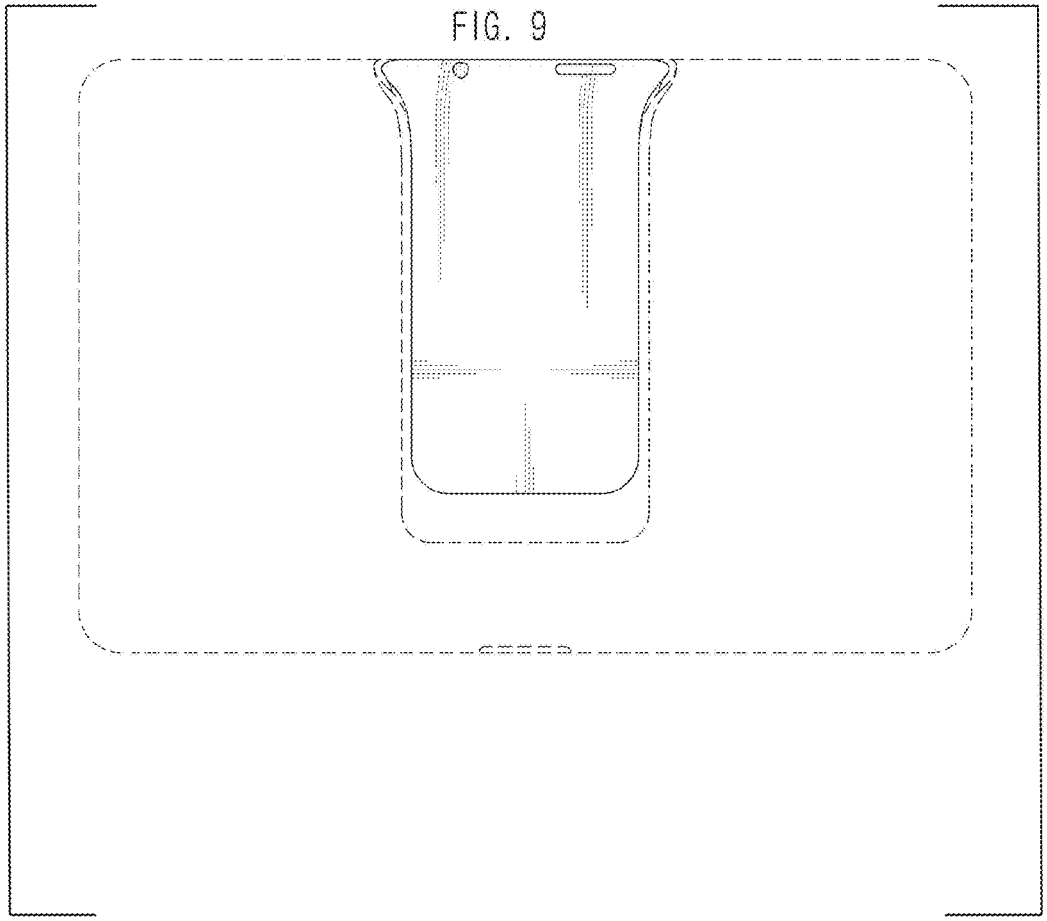

AMENDED
FIG. 9
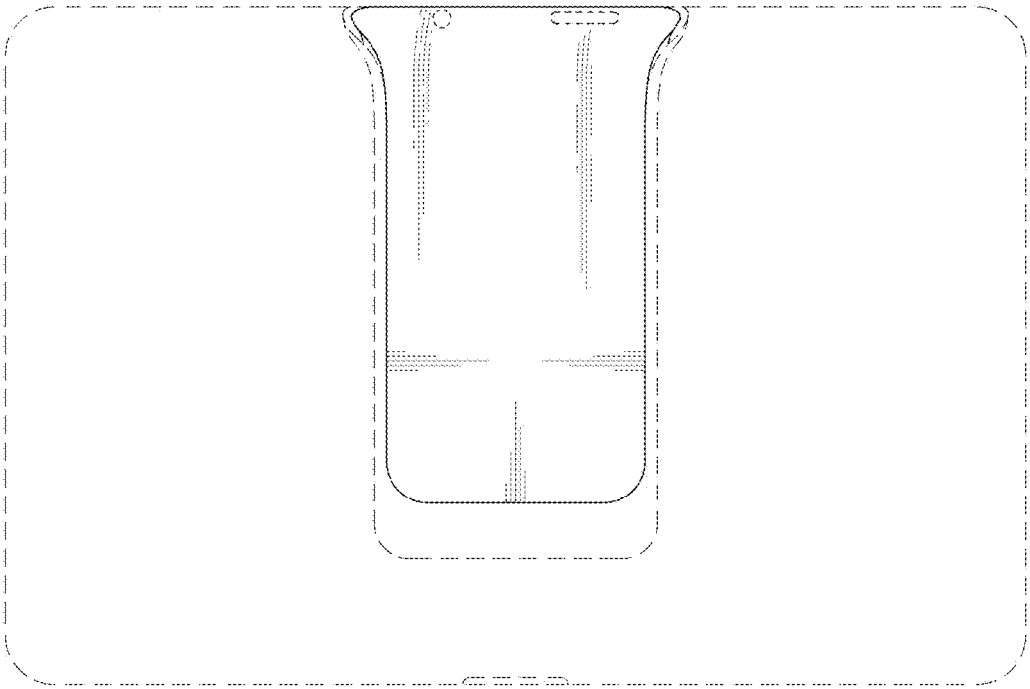

NEW
FIG. 10
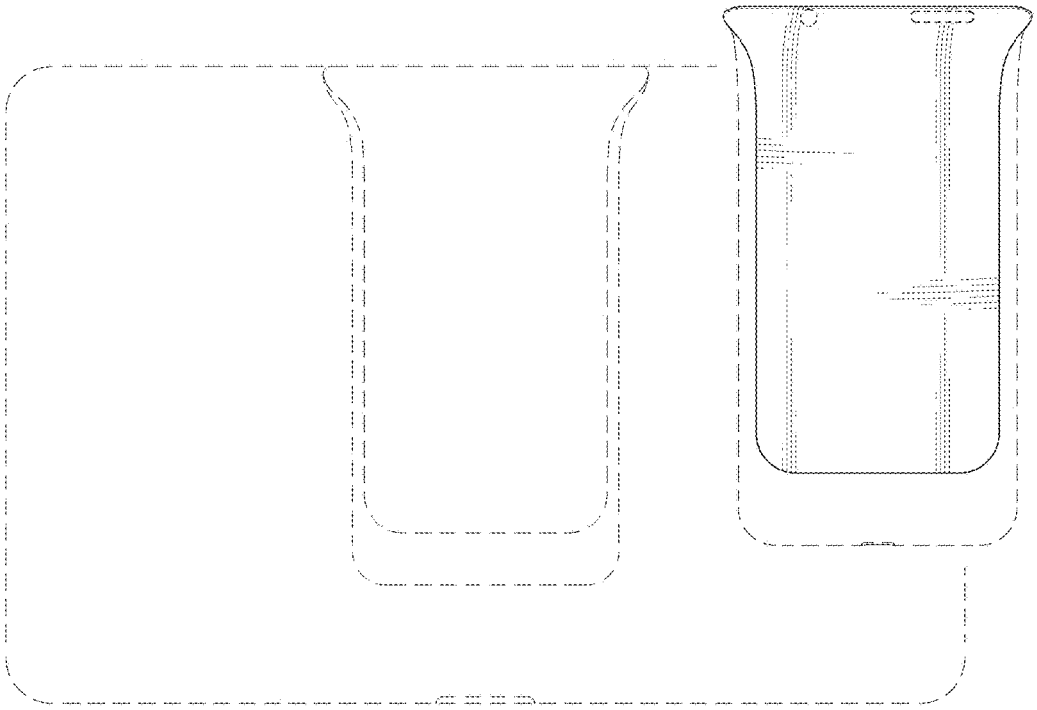

CANCELLED

CANCELLED

CANCELLED

CANCELLED

CANCELLED

CANCELLED

CANCELLED

CANCELLED

CANCELLED